Patented July 12, 1938

2,123,556

UNITED STATES PATENT OFFICE 2,123,556

ALIPHATIC HALOGEN-NITRO-ALCOHOLS AND PROCESS OF PREPARING THEM

Otto Nicodemus, Frankfort-on-the-Main-Hochst, and Otto Wulff, Konigstein in Taunus, Germany, assignors to I. G. Farbenindustrie Aktiengesellschaft, Frankfort-on-the-Main, Germany No Drawing. Application March 26, 1936, Serial No. 71,048. In Germany April 4, 1935

8 Claims. (Cl. 260—144)

The present invention relates to aliphatic halogen-nitro-alcohols and to a process of preparing them.

We have found that aliphatic halogen-nitro-alcohols of the following general formula:

$$R_1-CHX-(CH(OH)-CH(NO_2)-R_2$$

wherein $R_1$ and $R_2$ stand for aliphatic radicals or hydrogen and X stands for halogen, may be obtained by condensing halogenated aldehydes of the following general formula:

$$R_1-CHX-CHO$$

wherein $R_1$ stands for an aliphatic radical or hydrogen and X stands for halogen, with aliphatic nitro-hydrocarbons of the following general formula:

$$R_2-CH_2-NO_2$$

wherein $R_2$ stands for an aliphatic radical or hydrogen.

It is known that nitro-alcohols may be obtained by condensing aliphatic nitro-hydrocarbons with aldehydes. But it is surprising that it is possible to apply this reaction also to halogenated aldehydes of the above general formula, these halogenated aldehydes being, as is known, very sensitive to every condensing agent, but before all to alkalies.

The halogen-nitro-alcohols obtainable by the invention have hitherto not been known. The circumstance that in these compounds the halogen, the nitro-group and the alcohol-group are situated at three adjacent carbon atoms makes them suitable for various chemical reactions. They are useful as intermediate products for the production of many different substances which are important in the industry.

The condensation may be carried out under the conditions usual for such reactions, for instance in a feebly alkaline agent. As starting materials there may be used, for instance: chlor-acetaldehyde, brom-acetaldehyde, alpha-chlor-propionaldehyde, alpha-brom-propionaldehyde, alpha-chlor, butyraldehyde, alpha-brom-butyraldehyde; furthermore, nitromethane, nitroethane and 1-nitropropane.

The following examples serve to illustrate the invention, but they are not intended to limit it thereto:

1. To a solution of chlor-acetaldehyde in aqueous hydrochloric acid there is added nitromethane in a small excess; an aqueous solution of potassium carbonate is then added, while stirring well, until the solution has a feebly alkaline reaction. The whole is stirred for one hour at 45° C. to 50° C. From the reaction product thus obtained which is contained partly in the heavy oily layer and partly in the aqueous layer, there is obtained according to known methods the 1-chloro-3-nitro-2-propanol in a good yield. This product is a colorless, heavy oil which is soluble in water as well as in alcohol and ether. It boils at about 130° C. under a pressure of 12 millimeters of mercury.

When bromacetaldehyde is used instead of chloracetaldehyde, the corresponding 1-bromo-3-nitro-2-propanol is obtained.

2. When in Example 1 the nitro-ethane is substituted for the nitro-methane there is obtained, by the same method of operating, the 1-chloro-3-nitro-2-butanol in the form of a heavy oil which boils at about 105° C. to 115° C. under a pressure of 8 millimeters of mercury.

We claim:

1. The process which comprises condensing an aldehyde of the following general formula:

$$R_1-CHX-CHO$$

wherein $R_1$ is a member of the group consisting of aliphatic radicals and hydrogen and X stands for halogen, with a compound of the following general formula:

$$R_2-CH_2-NO_2$$

wherein $R_2$ is a member of the group consisting of aliphatic radicals and hydrogen.

2. The process which comprises condensing an aldehyde of the following general formula:

$$CH_2X-CHO$$

wherein X stands for halogen, with a compound of the following general formula:

$$R_2-CH_2-NO_2$$

wherein $R_2$ is a member of the group consisting of hydrogen and alkyl radicals containing at most two carbon atoms.

3. The process which comprises condensing chloracetaldehyde with nitromethane.

4. The process which comprises condensing chloracetaldehyde with nitroethane.

5. The compounds of the following general formula:

$$R_1-CHX-CH(OH)-CH(NO_2) \cdot R_2$$

wherein $R_1$ and $R_2$ are members of the group consisting of aliphatic radicals and hydrogen and X stands for halogen, said products being colorless oils, soluble in alcohol and ether.

6. The compounds of the following general formula:

$$CH_2X—CH(OH)—CH(NO_2)—R_2$$

wherein $R_2$ is a member of the group consisting of hydrogen and alkyl radicals containing at most two carbon atoms and X stands for halogen, said products being colorless oils, soluble in alcohol and ether.

7. The 1-chloro-3-nitropropanol-2, being a colorless oil soluble in alcohol and ether and showing a boiling point of about 130° C. under a pressure of 12 millimeters of mercury.

8. The 1-chloro-3-nitrobutanol-2, being a colorless oil soluble in alcohol and ether and showing a boiling point of about 105° C. to 115° C. under a pressure of 8 millimeters of mercury.

OTTO NICODEMUS.
OTTO WULFF.